April 7, 1964    F. A. WILLIAMS    3,127,824
EXPOSURE CONTROL MECHANISM FOR PHOTOGRAPHIC CAMERA
Filed Jan. 24, 1963    2 Sheets-Sheet 1
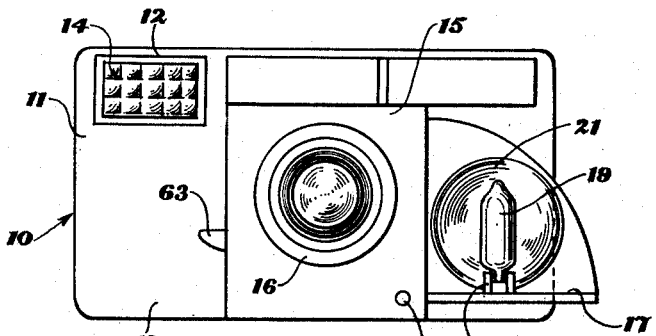
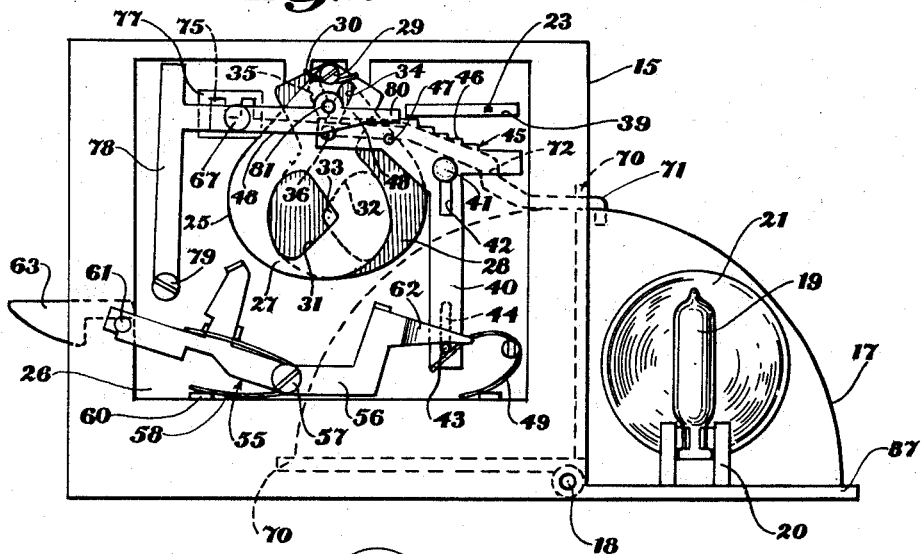
*Francis A. Williams*
INVENTOR.

United States Patent Office 3,127,824
Patented Apr. 7, 1964

3,127,824
EXPOSURE CONTROL MECHANISM FOR
PHOTOGRAPHIC CAMERA
Francis A. Williams, Rochester, N.Y., assignor to Eastman Kodak Company, Rochester, N.Y., a corporation of New Jersey
Filed Jan. 24, 1963, Ser. No. 253,689
8 Claims. (Cl. 95—10)

The present invention relates to photographic cameras, and more particularly to such cameras having an automatic exposure control system which can be readily adapted to either daylight or flash operation.

It is well known to utilize an exposure meter which comprises a photoelectric cell coupled to a galvanometer-type electrical measuring instrument for positioning a pointer or other output member as a function of scene brightness. In a common camera arrangement, the size of the exposure aperture is established automatically, in response to variations in scene brightness, by a member that is coupled to the diaphragm and movable into a position in which it engages or otherwise senses the pointer or output member. In the case of flash operation, however, the automatic exposure control system is usually disabled and regulation of the exposure aperture is then accomplished by suitable manually operable means. In the present invention, the sensing member is not disabled for flash operation, but is provided with two sensing elements, one for establishing the size of the exposure aperture as a function of scene brightness, as described above, and the other for establishing the size of the exposure aperture as a function of focus adjustment by sensing a member that is positioned for sensing only when the camera is adjusted for flash operation.

When a camera having an automatic exposure control system is used for flash photography, it is the general practice to resort to manual setting of the exposure aperture. Under such manual operation, it frequently happens that the operator forgets to make the necessary manual setting or else fails to select the optimum diaphragm setting. In the present invention, the flash lamp holder is mounted on the camera for movement between a daylight position in which it is enclosed within the camera housing and a flash position in which it lies outside the housing. As the holder is moved from the daylight to the flash position, a control member that is coupled to the focus adjustment is moved into a range of positions where it can be engaged by the sensing member, and is finally positioned within that range as a function of focus adjustment, such that an optimum exposure aperture is established when the control member is later engaged by the sensing member. The relationship of the output member to the control member and of the two sensing elements is such that with flash operation the position of the control member is always sensed before that of the output member, thereby eliminating the necessity for disabling the exposure control system.

It is a principal object of the invention to provide a camera in which an improved exposure control system comprises a single member coupled to the diaphragm and capable of being positioned as a function of scene brightness or as a function of focus adjustment to obtain the optimum exposure aperture in accordance with either daylight or flash operation.

Another object of the invention is to provide a camera having a flash lamp holder which is movable between a daylight position in which the exposure aperture is established as a function of scene brightness and a flash position in which the exposure aperture is established as a function of focus adjustment.

And still another object of the invention is to provide a camera with a flash lamp holder that is pivotally mounted on the camera for movement between a position within the camera casing to a position without the camera casing and in which latter position the exposure aperture is established as a function of focus adjustment.

Other objects and advantages of the invention will be apparent to those skilled in the art by the description which follows. Reference is now made to the accompanying drawings wherein like reference numerals designate like parts and wherein:

FIG. 1 is a front view of a camera embodying the invention and showing the flash lamp holder in a position without the camera casing for flash operation;

FIG. 2 is a front elevation view of the mechanism for controlling actuation of the diaphragm and for establishing the size of the exposure aperture with the flash lamp holder in a position for flash operation;

FIG. 5 is a partial plan view of the elements shown in FIG. 2 and shows their spatial relationship.

Figure 3:
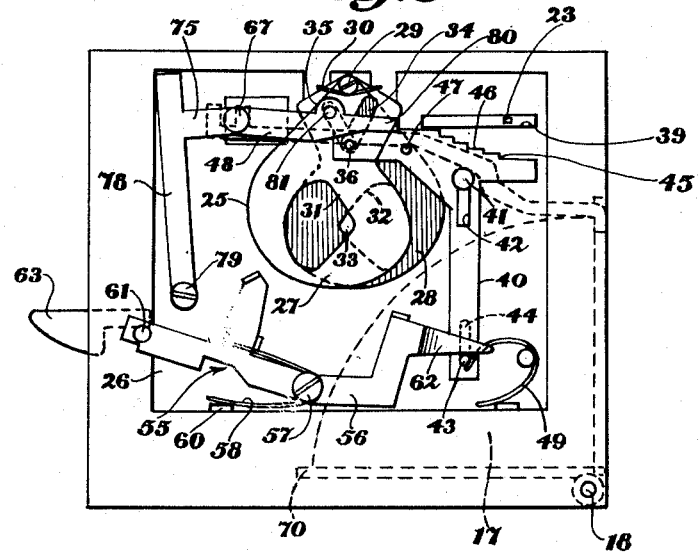
FIG. 3 is a front elevation view similar to FIG. 2 and showing the relation of the various elements of the mechanism when the flash lamp holder is moved to a position within the camera casing for daylight operation.
Figure 4:
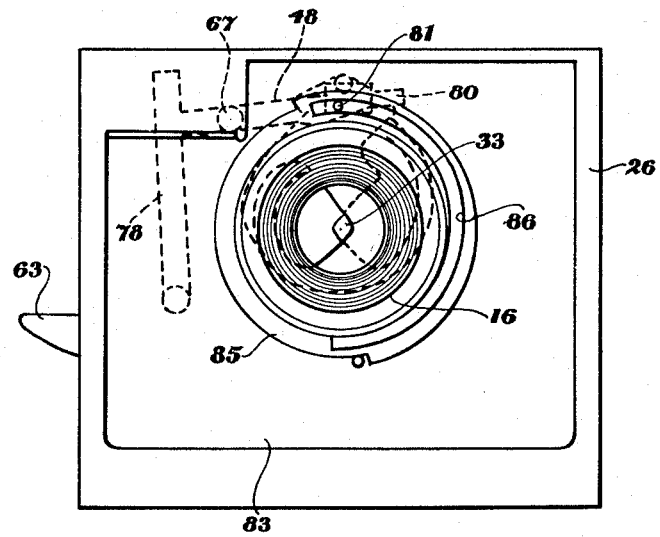
FIG. 4 is a front elevation view of the objective lens mount and shows the relationship of the focus cam to the mechanism shown in FIGS. 2 and 3 for establishing the size of the exposure aperture as a function of focus adjustment.

With reference to the drawings, and particularly to FIG. 1, the camera 10 comprises a casing 11 having an aperture 12 in the front wall 13 in which a photoelectric cell 14 is positioned for energization by scene light. The front wall 13 is provided with an extension 15 on which the focusing objective mount 16 is mounted in a well known manner. At the right-hand side of extension 15, a flash lamp holder 17 is pivotally mounted at 18 for movement between a position in which it is totally within extension 15, as shown in FIG. 3, to a position, as shown in FIG. 2, in which it is without the extension 15 for receiving a flash lamp 19 in a well known manner in the mount 20. The holder 17 is also provided with a reflector 21 which is positioned behind the lamp 19 and can be formed as an integral part of the holder per se.

The photocell 14 is connected to a galvanometer-type measuring instrument 22 which carries a pointer or output member 23 and positions this member as a function of the intensity of the scene light incident on the photocell 14, see FIG. 5.

An exposure regulating device 25 is mounted on plate 26 that forms a part of the extension 15. The exposure regulating device comprises diaphragm blades 27 and 28 which are pivotally mounted on a common stud 29 and urged in opposite directions about the stud 29 by spring 30. The diaphragm blades are provided with openings 31 and 32 which together form an exposure aperture 33 as is well known in the art. The blades are also provided with elongated slots 34 and 35 which are engaged by pin 36 for operating the blades in a manner to be described hereinafter.

The sensing member 40 is slidably mounted on plate 26 by stud 41 which extends through the slot 42 in member 40 and the pin 43 carried by member 40 and engaging slot 44 in plate 26. A portion 45 of sensing member 40 is provided with stepped sensing cams 46 for engaging the output member 23 which extends through aperture 39 in plate 26 and a portion or pin 47 for engaging a control member 48 as described hereinafter. The sensing member 40 also carries the pin 36 for actuating the diaphragm blades 27 and 28. The spring 49 has one end which engages the pin 43 on sensing member 40 for urging it in an upward direction toward output member 23. However, the sensing member 40 is retained in the lower or disabled position by the operating means broadly designated by the numeral 55.

The operating means 55 comprises a lever 56 that is pivotally mounted on plate 26 by stud 57 and is urged in a clockwise direction by spring 58 which encircles the stud 57 and has one end in engagement with the lever 56 and the other in engagement with the lug 60 on plate 26. A finger operating member 63 is slidably mounted in the extension 15 for movement in a downward direction against the pin 61 on lever 56, thereby moving said lever in a counterclockwise direction and removing the nose 62 thereof from engagement with the pin 43 on sensing member 40. When this occurs, sensing member 40 is urged in an upward direction by spring 49 and its movement is arrested when one of the sensing cams 46 engage the output member 23. As sensing member 40 moves upward, pin 36 is also moved against the intersection of slots 34 and 35 to pivot blades 27 and 28 for adjusting the size of the exposure aperture 33. When sensing member 40 is brought to a stop by engagement of one of cams 46 with output member 23, pin 36 will have established the size of the exposure aperture in accordance with the position of output member 23 or as a function of scene brightness. This movement of sensing member 40 and the establishment of the size of the exposure aperture 33 by output member 23 can be accomplished because the pin 47 on sensing member 40 is movable past the end of control member 48 whose position is determined by the position of the flash lamp holder 17 which, in this case, is within the extension 15. When the finger piece 63 is released, spring 58, which is stronger than spring 49, causes lever 56 to be moved in a clockwise direction so that the nose 62 engages pin 43 and urges the sensing member 40 in a downward direction to release the engaging cam 46 from the output member 23. It is to be understood, of course, that at the time that finger piece 63 is moved in a downward direction, the shutter is actuated in timed relation with the sensing of output member 23 and the establishment of the size of the exposure aperture.

When flash lamp holder 17 is moved to a position without the extension 15, a lip 70 on the inner end thereof engages a lug 71 on the member 72 which is slidably mounted on plate 26 by means of pins 73 which engage suitable elongated slots 74 in said member, see FIG. 5. The other end of member 17 is provided with a yoke portion 75 which engages the end of a stud 67 which projects through an aperture 77 in plate 26. The stud 67 provides a pivot at the free end of lever 78 which is pivotally mounted at 79 for the control member 48.

As the flash lamp holder 17 approaches its fully extended position outside the extension 15, the lip 70 engages lug 71 and moves member 72 to the right, as shown in FIGS. 2 and 3, whereby the inner left-hand edge of yoke 75 engages stud 76 and moves lever 78 and control member 48 therewith to the right. This movement of lever 78 and control member 48 places the free end 80 of control member 48 in the path of pin 47 on sensing member 40. A pin 81, which is carried by control member 48, extends through a slot 82 in plate 83 on which the objective mount 16 is mounted. A plate 85, having a cam slot 86, is movable with the objective mount and the cam serves to position the pin 81 as a function of focus adjustment which, in turn, is translated to movement of control member 48 to position the free end 80 thereof with respect to the pin 47 on sensing member 40. Due to the relationship of pin 47 to the free end 80 of control member 48, the pin 47 will arrest movement of the sensing member 40 when released by finger piece 63, as described above, before any one of the cams 46 can engage the output member 23. As a result, with the flash lamp holder 17 in a position without the extension 15 for flash operation, the size of the exposure aperture 33 will be established by the engagement of pin 47 with the free end 80 of control member 48, the size of the exposure aperture then being a function of the focus adjustment, rather than a function of scene brightness.

When the flash lamp holder 17 is moved to its position within the extension 15, the lip 70 will be moved away from the lug 71, and as the holder reaches its innermost position, the lip 87 will abut the lug 71 and move member 72 to the left. The first portion of the movement of member 72 provides no movement of control member 48 until the right-hand side of yoke 75 engages stud 76. At this time, lever 78 and control member 48 are moved with member 72 to the left so that the free end 80 of control member 48 is moved out of the vertical path of movement of pin 47. The sensing member 40 is then enabled for normal daylight operation wherein one of cams 46 will engage the output member 23 to again establish the size of the exposure aperture 33 as a function of scene brightness.

While the invention has been described above with respect to a particular type of diaphragm, it will be readily appreciated by those skilled in the art that other types of diaphragms can be equally well adapted to the same mode of operation without departing from the teaching of the present invention. Also, a member other than the flash lamp holder can be mounted on the camera for movement between two positions so as to control the size of the exposure aperture either as a function of the scene brightness or of the focus adjustment. Since other modifications and changes may be suggested to those skilled in the art by the above embodiment of the invention, the invention is not to be limited to the disclosed embodiment, but is of a scope defined by the appended claims.

I claim:
1. In a camera having a focus adjusting means, an exposure regulating device comprising an adjustable diaphragm having a range of exposure apertures, and an exposure meter energizable by scene light and having an output member positionable as a function of the intensity of said light, the combination comprising:
   control means coupled to said focus adjusting means and adapted to be positioned thereby for establishing the size of the exposure aperture as a function of focus adjustment;
   selection means movable between a first position in which the exposure aperture is established as a function of scene light and a second position in which the exposure aperture is established as a function of focus adjustment;
   yieldably movable means coupled to said diaphragm and, upon release, for selectively sensing the position of said output member or of said control means in accordance with the position of said selection means to adjust said diaphragm to an exposure aperture corresponding thereto;
   means coupled to said control means and engaged by said selection means when in said first position for maintaining said control means in a disabled position relative to said sensing means and engageable by said selection means as it is moved into said second position for moving said control means into an enabled position relative to said sensing means; and
   operating means normally maintaining said sensing means in a disabled position and manually movable to a position for releasing said sensing means to establish the exposure aperture.

2. A camera in accordance with claim 1 wherein said control means comprises a cam movable with said focus adjusting means, a first lever pivotally mounted at one end thereof, and a second lever pivotally mounted on the free end of said first lever and having a portion thereof in engagement with said cam, the free end of said second lever being positioned by said cam relative to said movable means to establish the size of the exposure aperture as a function of focus adjustment.

3. A camera in accordance with claim 1 wherein said selection means comprises a flash lamp holder mounted on said camera for movement between said first position and said second position.

4. A camera in accordance with claim 1 wherein said selection means comprises a flash lamp holder pivotally mounted on said camera for movement between said first position in which said flash lamp holder is within said camera and said second position in which said flash lamp holder is without said camera.

5. A camera in accordance with claim 1 wherein said sensing means is provided with a first portion for sensing only the position of said output member when said selection means is in said first position and with a second portion for sensing only the position of said control means when said selection means is in said second position to adjust said diaphragm to an exposure aperture corresponding thereto.

6. In a camera having a focus adjusting means, an exposure regulating device comprising an adjustable diaphragm having a range of exposure apertures, and an exposure meter energizable by scene light and having an output member positionable as a function of the intensity of said light; the combination comprising:

means for controlling the size of the exposure aperture comprising a cam movable with said focus adjusting means, a first lever pivotally mounted at one end thereof and a second lever pivotally mounted on the free end of said first lever and having a portion thereof in engagement with said cam, the free end of said second lever being positioned by said cam as a function of focus adjustment;

a flash lamp holder mounted on said camera for movement between a daylight position in which the size of the exposure aperture is established as a function of scene light and a flash position in which the size of the exposure aperture is established as a function of focus adjustment;

yieldably movable means coupled to said diaphragm and, upon release, having a first portion for sensing only the position of said output member when said flash lamp holder is in said daylight position and a second portion for sensing only the position of the free end of said second lever when said flash lamp holder is in said flash position to adjust said diaphragm to an exposure aperture in accordance with the position of said flash lamp holder;

means coupled to said control means and engaged by said flash lamp holder when in said daylight position for maintaining said second lever in a displaced position relative to the second portion of said sensing means and engageable by said flash lamp holder as it is moved into said flash position for moving said control means into an enabled position in which said second lever is positioned relative to the second portion of said sensing means; and operating means normally maintaining said sensing means in a disabled position and manually movable to a position for releasing said sensing means to establish the exposure aperture.

7. A camera in accordance with claim 6 wherein said flash lamp holder is pivotally mounted on said camera for movement between said daylight position in which said flash lamp holder is within said camera and said flash position in which said flash lamp holder is without said camera.

8. A camera in accordance with claim 6 wherein said output member and the free end of said second lever are displaced relative to each other in such a manner that in any position of said second lever, when said control means is in the enabled position, the second portion of said sensing means will engage the free end of said second lever before said first portion engages said output member.

References Cited in the file of this patent
UNITED STATES PATENTS

| | | |
|---|---|---|
| 2,967,489 | Lachaize | Jan. 10, 1961 |
| 3,001,461 | Irwin | Sept. 26, 1961 |
| 3,005,392 | Kaden | Oct. 24, 1961 |
| 3,051,066 | Lareau | Aug. 28, 1962 |